United States Patent [19]

Schürch

[11] 4,313,898
[45] Feb. 2, 1982

[54] RADIAL INJECTOR FOR ASPIRATION OF GASES

[76] Inventor: Ernst Schürch, Obergrundstr. 3, CH-6000 Luzern, Switzerland

[21] Appl. No.: 135,618

[22] Filed: Mar. 31, 1980

[30] Foreign Application Priority Data

Apr. 7, 1979 [CH] Switzerland .................... 3297/79

[51] Int. Cl.³ .............................................. B01F 3/04
[52] U.S. Cl. .................................... 261/93; 209/169; 210/219; 210/220; 261/DIG. 75; 366/102; 366/165; 366/249; 416/185; 416/231 B
[58] Field of Search ............. 261/93, 87, 91, DIG. 75; 209/169, 170; 210/219, 220; 366/102, 165, 249; 416/185, 231 B, 235, 236 R; 435/313, 315

[56] References Cited

U.S. PATENT DOCUMENTS

| | | | |
|---|---|---|---|
| 1,242,445 | 10/1917 | Ittner | 261/93 X |
| 1,976,956 | 10/1934 | MacLean | 261/93 |
| 2,246,560 | 6/1941 | Weinig et al. | 261/93 |
| 2,393,976 | 2/1946 | Daman et al. | 209/169 |
| 2,767,965 | 10/1956 | Daman | 366/102 X |
| 3,053,390 | 9/1962 | Wood | 261/93 X |
| 3,278,170 | 10/1966 | Moritz | 261/93 X |
| 3,355,106 | 11/1967 | Graham | 261/93 X |
| 3,490,996 | 1/1970 | Kelly, Jr. | 261/93 X |
| 3,610,590 | 10/1971 | Kaelin | 416/236 R X |
| 3,823,923 | 7/1974 | Chapsal | 261/93 |
| 3,850,543 | 11/1974 | Kaelin | 416/236 R X |
| 3,984,001 | 10/1976 | Nagano et al. | 261/93 X |
| 4,193,949 | 3/1980 | Naito | 261/93 X |

FOREIGN PATENT DOCUMENTS

| | | | |
|---|---|---|---|
| 449091 | 9/1927 | Fed. Rep. of Germany | 261/93 |
| 281144 | 6/1952 | Switzerland | 261/93 |

*Primary Examiner*—Richard L. Chiesa
*Attorney, Agent, or Firm*—Michael J. Striker

[57] ABSTRACT

A radial injector having a rotational disk through which gases are aspirated from the atmosphere and mixed with a fluid contacting the disk at the other side thereof. The disk is defining a ring slot by cooperating with a flange portion of the housing. Upon rotation of the disk, the fluid is accelerated towards the periphery of the disk thereby developing an undertow in the ring slot. Consequently gases are aspirated and injected into the fluid.

28 Claims, 13 Drawing Figures

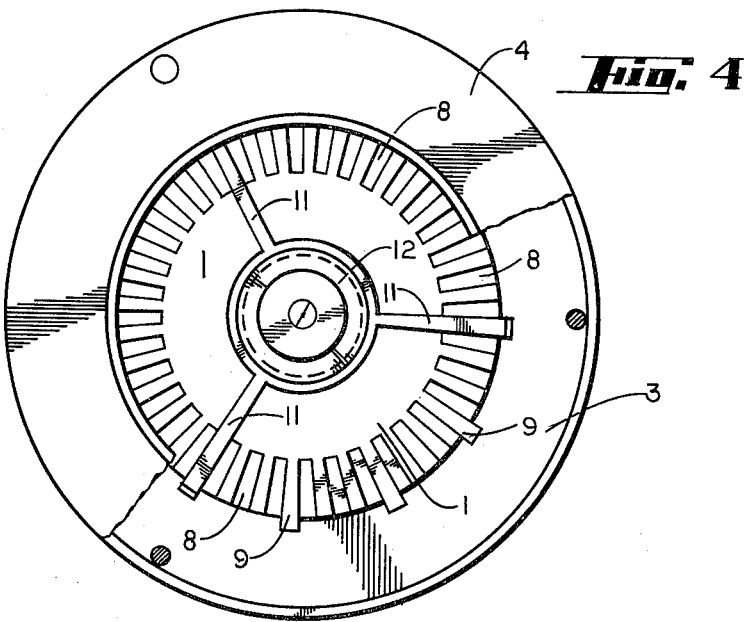
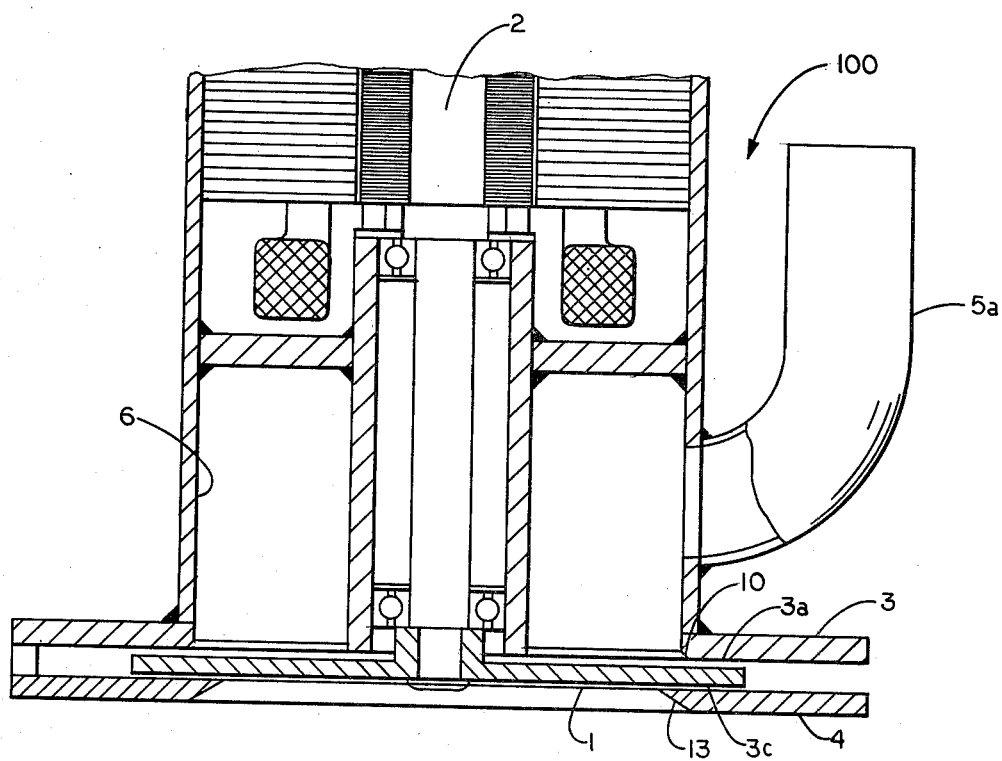

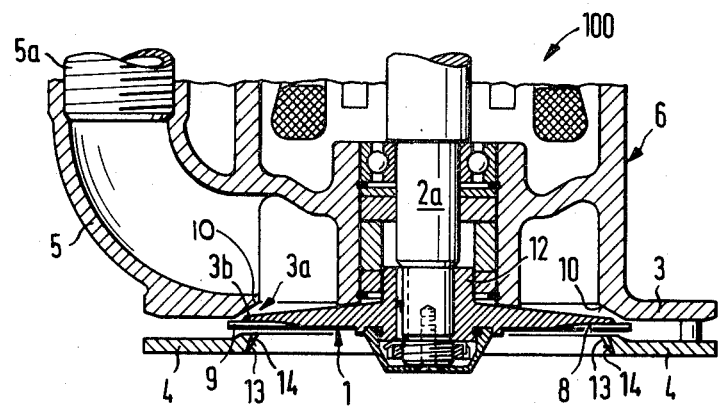
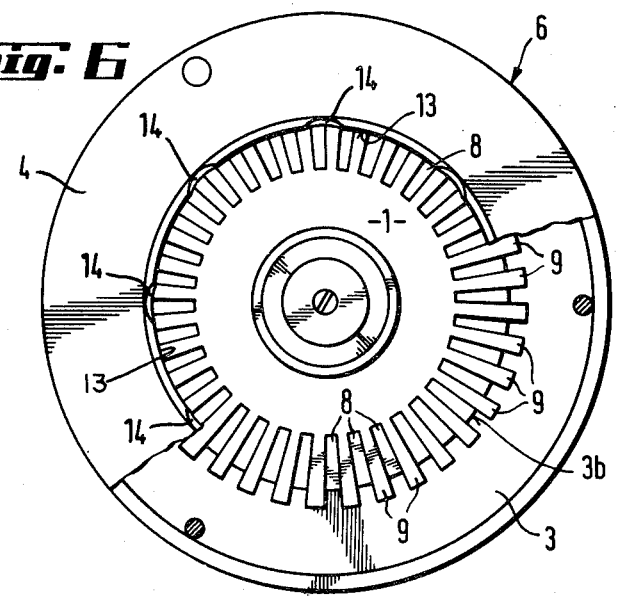

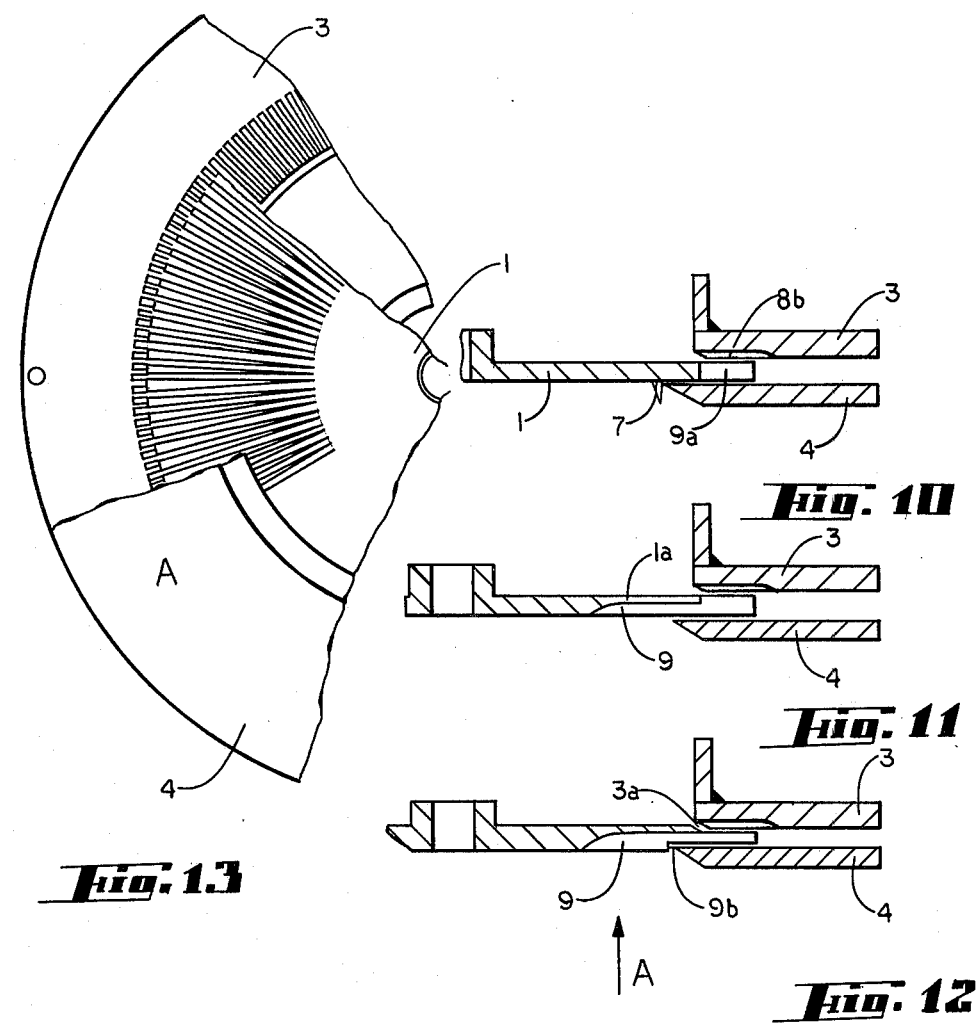

RADIAL INJECTOR FOR ASPIRATION OF GASES

BACKGROUND OF THE INVENTION

The invention relates to a radial injector for aspiration of gases, and more particularly to a radial injector for aerating of fluids.

Several aerating devices are known from the prior art in which disks having vanes or the like generate turbulence within a fluid to be aerated. The disk having one side contacted by the gas and another side contacted by the fluid, is provided with holes through which the gas is sucked from the one to the other side and introduced into the fluid. Such a device is disclosed in German Published Application DE-AS No. 15, 57, 138. However, the suction effect on the gases is relatively small and is limited by the cross section of the holes so that the quantity of gas which can be aspirated may not be sufficient, especially when the device must be immersed deeply into the fluid.

Furthermore, coaxial injectors are known—so-called water jet pumps—which, however, also have a relatively small efficiency.

SUMMARY OF THE INVENTION

It is a general object of the invention to overcome the difficult of the prior art.

More particularly, it is an object of the invention to create an injector in which the suction effect is considerably increased in comparison to prior art injectors.

Yet another object of the invention is to provide an injector which can be completely immersed into the fluid without any impairment of the suction effect.

A concomitant object of the present invention is to achieve an injector which is simple in construction, reliable in operation and inexpensive to manufacture nevertheless.

In keeping with these objects, and others which will become apparent hereafter, one feature of the invention resides, briefly stated, in a radial injector for aspirating in of gases and aerating of fluids wherein the radial injector includes a motor housing in which a motor in contained, rotating means connected to the motor and having a bottom side to be contacted by a fluid and a top side to be contacted by the gas, and means cooperating with the rotating means for providing a ring slot.

According to another feature of the invention, the rotating means is constructed as a rotating disk and the means cooperating with the rotating disk is a flange portion which is integrally connected to the motor housing wherein the ring slot is defined by the flange portion which partly overlaps the outer border of the rotating disk. The rotating disk is driven by a shaft which, normally will have a vertical orientation whereas the surface of the rotating disk will have an approximately horizontal orientation. In such a construction the housing will be arranged above the disk while the flange portion which is projecting outwardly is formed the end of the lower section of the housing.

The side of the rotating disk contacted by the fluid can be provided with a smooth surface or, preferably, is formed with radially extending recesses, such as grooves or channels. At the radially outer region of the disk the grooves may be cut away over the entire disk thickness so as to form teeth at the outer disk circumference. The radially extending channels may be uniformly spaced around the periphery of the disk. The depth of each channel, i.e. the dimension of each tooth, may be approximately between 1 and 2 mm depending upon the quantity of fluid to flow through, so that the manufacture of the disk is very simple but achieving a sufficient acceleration of the fluid nevertheless. Moreover, it is possible to manufacture the disk by a precision casting method which does not require a refinishing operation. It is especially advantageous to arrange the teeth in such a manner that they project beyond the periphery of the disk, thereby providing respective slits in radial elongation of each channel. Thus, the fluid and the gas are quickly brought together and are additionally mixed to thereby obtain an aeration of the fluid with gas in a very intense and efficient manner. It is, however, also possible to arrange the projecting teeth in such a manner that they are uniformly spaced around the periphery of the disk at a greater distance to each other thereby obtaining that the disk edge portion located between two projecting teeth are flush with the respective channels. Such a provision has the advantage of increasing the cross section in the area of the ring slot while still obtaining an additional acceleration and mixing on the periphery of the disk by each projecting tooth.

According to yet another feature of the invention, the flange portion is provided with an outwardly tapered bevel on the edge overlapping the rotating means, thereby developing the ring slot in a conical shape. Consequently, the flow conditions are improved, especially on the suction side, since the tapering permits an additional acceleration of the aspirated gases.

The suction effect which is considerably increased through the provision of channels since the rotating disk can accelerate a higher quantity of fluid and centrifuge it outwardly, can be improved still further by providing at least two radially extended ribs. The ribs are uniformly spaced around the surface of the disk which is contacted by the fluid and project in axial direction of the housing by some millimeters.

According to still another feature of the invention, the radial injector is provided with an annular cover plate at a distance to the disk on the side facing the fluid, wherein the inner diameter of the cover plate is smaller than the outer diameter of the rotating disk. Consequently, a second ring slot is formed which is approximately diametrically opposite to the ring slot defined by the flange portion and the top side of the rotating disk. Thus, the disk rotates within a slit defined by the flange portion and the cover plate, into which slit the fluid is forced and the gas is aspirated. The mutual arrangement between the flange portion and the annular cover plate does not only define the slit in between but also an outwardly open mixing and diffuser space which is disposed in radial elongation of the rotating disk. The distance between the flange portion and the cover plate is dependent on the thickness of the disk on the outer border and the mutual clearance of the disk relative to the flange portion and the cover plate.

The cover plate is advantageously arranged with a stepped wedge-shaped rim at the side facing the disk in order to retain impurities in the fluid to be aerated from flowing into the mixing and diffuser space. The provision of such a rim is especially suitable when aerating sewage effluent, waste water or contaminated fluid. The retaining effect of impurities reaching the rotating disk from the side of the fluid can further be improved and facilitated by providing a plurality of arched recesses at a distance to each other on the periphery of the retaining rim.

According to a further feature of the present invention the retaining of impurities can be still further improved by arranging a preferably circular and advantageously smooth rejecting plate at a distance to the rotating disk of about 5 to 15% of the diameter of the disk. The rejecting plate has an outer diameter corresponding to the inner diameter of the cover plate and is coaxially driven with the disk and preferably arranged on the same shaft. Thus, impurities are centrifuged away and cannot reach the rotating disk which is thus contacted by a fluid that is at least roughly purified. Consequently, the risk of malfunction in the area of the ring slot and in the mixing and diffuser space is practically prevented.

Through the provision of a radial injector according to the invention, the fluid is centrifuged outwardly, thereby exerting a considerable suction effect in the region of the ring slot, i.e. the region in which the highest velocity occurs. Thus, the fluid can sweep off a respectively high quantity on gas. When immersing the radial projector into a fluid, the fluid is penetrating through the ring slot into the space above the rotating disk. Consequently, at the beginning of the operation, first this fluid is swept away out of the ring slot until the gas e.g. from the atmosphere has flowed into the space. The fluid serving as the working medium is accelerated towards the outer periphery of the rotating disk so that the gas serving as the suction medium is swept away at the moment when the fluid has obtained its maximum speed at the disk. Therefore, the inventive radial injector constructed as a pump and an injector is forming an inseparable unit which is of simple construction and nevertheless of great effectivity to achieve an intense aeration of the fluid. Furthermore, the radial injector according to the invention can serve as a suction pump for producing a vacuum since the outer periphery of the rotating disk is in effect acting like a water jet jump.

It is to be noted that apart from the flow change from laminar flow to eddy motion, the thickness of the outer periphery of the disk contacted by the working medium is essentially independent of the diameter of the disk, so that the injection surface as well as the accelerated medium is essentially proportional to the diameter of the rotating disk. Consequently, upon linear increase of the active injection surface, the drive power required for the radial injector according to the invention also increases linearly while, contrary thereto in conventional coaxial injectors or water jet pumps the drive power is increased quadratically. Thus, increasing of the suction effect does not require any oversized increasement of the drive power when considering the radial injector according to the invention. Although the accelerated medium is more than proportionally increased when increasing the diameter of the disk because of the increasing radial speed, however, this fact is improving the quantity of fluid to be transported. Moreover, in comparison with waterjet pumps, the radial injector according to the invention has the advantage that the working medium has its maximum speed when reaching the outer periphery and meeting the suction medium. This effect is further intensified by the channels on the side of the disk contacted by the fluid.

Moreover, it is to be noted that through the provision of the teeth at the outer border of the disk, oscillations are generated which are in the ultrasonic range. This results in the formation of micro bubbles, which is advantageous when the radial injector is to be used for mixing processes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 4 is a view from below on the radial injector according to FIG. 2 in which a plurality of projecting teeth is depicted;

FIG. 5 is a longitudinal section of the lower region of the radial injector depicting a retaining rim provided with arched recesses;

FIG. 6 is a view from below on the radial injector according to FIG. 5;

FIG. 9 is a longitudinal section of a second embodiment of a radial injector;

FIG. 10 is a sectional view of the radial injector illustrating a flange portion provided with channels, a rotating disk provided with projections forming a slit in between and a cover plate;

FIG. 11 is a sectional view according to FIG. 10 wherein the rotating disk is additionally provided with channels;

FIG. 12 is a sectional view according to FIG. 11 wherein the rotating disk is provided with a stepped portion; and FIG. 13 is a view from below on the radial injector illustrating the cover plate, the rotating disk and the flange portion.

DESCRIPTION OF THE PREFERRED EMBODIMENTS

Figure 1:
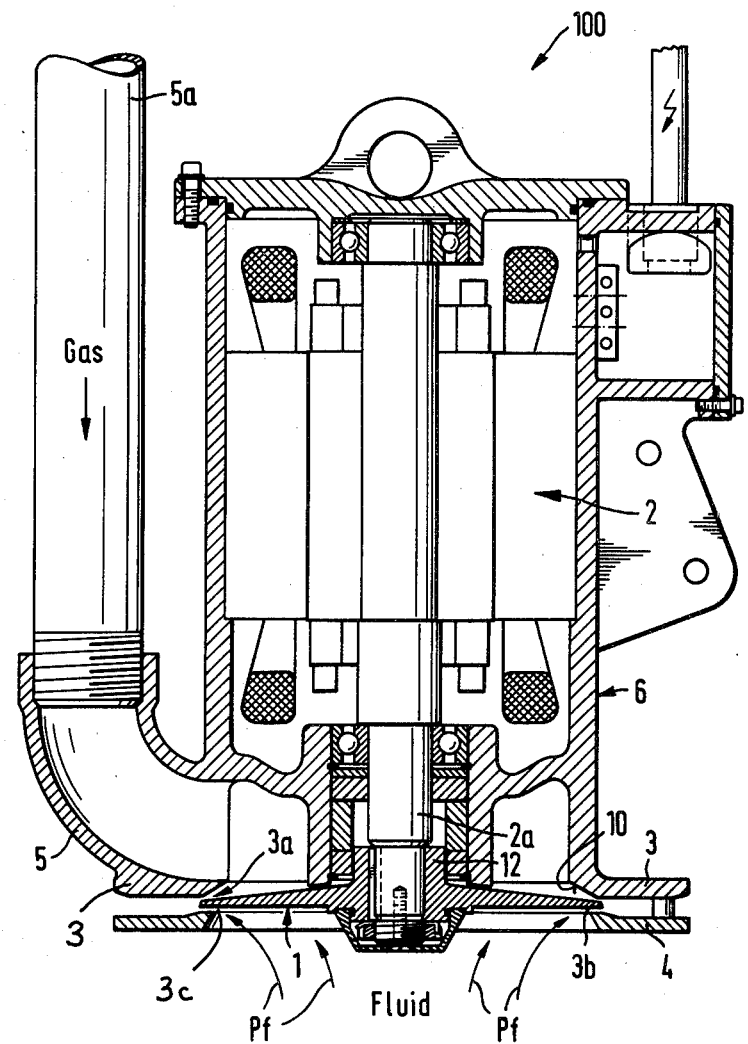
FIG. 1 shows a longitudinal section of a first embodiment of a radial injector according to the invention.

Referring firstly to FIG. 1, there is shown a radial injector 100 for aspirating of gases, especially for aerating of fluid for example with air. The radial injector 100 is provided with a motor 2, for example, an electromotor which is encased by a housing 6. The housing 6 is constructed in an elongated shape and is provided with an intake stack 5 in the lower region thereof where the intake stack 5 is connected with a conduit 5a through which the gas is introduced. The motor 2 is associated with a shaft 2a extending in axial direction of the housing 6. The shaft 2a has one end adjacent to the intake stack 5 which supports a rotating disk 1 via a hub 12 in such a manner that the rotating disk 1 is horizontally arranged to the housing 6. Consequently, it is possible to immerse the radial radiator 100 completely into the fluid since the conduit 5a can be so dimensioned as to be above the fluid level.

As can be seen from FIG. 1, the housing 6 is provided with an outwardly projecting flange portion 3 at the lower end thereof. The rotating disk 1 has an outer region 3b cooperating with the flange portion 3 in such a manner that a ring slot 3a is developed. In the shown embodiment, the flange portion 3 has an edge facing the disk of a bevel-shape so as to form a conical ring slot 3a. At a distance to the flange portion 3 and essentially coaxially arranged thereto, there is disposed a cover plate 4 cooperating with the flange portion 3 in such a manner that the outer region 3b of the disk 1 is projecting into the space between the flange portion 3 and the cover plate 4, so as to form a passage 3c which is defined by the disk 1 and the cover plate 4.

When immersing the radial injector 100 into the fluid, the fluid will first penetrate into the space above the rotating disk 1 which space is in connection with the intake stack 5. The motor 2 is then energized to rotate the disk 1. Consequently, the fluid is centrifuged outwardly, as indicated by arrows Pf, so that a suction action is exerted. Therefore, through the formation of the undertow, the fluid at first located in the ring slot 3b and within the intake stack 5 is swept away with the fluid flowing through the passage 3c. When all fluid is removed therefrom, the radial injector 100 then aspirates gas, e.g. air from the atmosphere, and thus injects this gas into the outwardly centrifuged fluid. The arrangement of the radial injector 100 can be considered as a type of a radial water jet pump wherein the radial injector 100 can obtain a high suction effect because of a high rotational speed and the action over the entire periphery of the disk 1. Consequently, the entire radial injector 100 can be immersed deeply into the fluid.

The disk 1 is formed so as to have a horizontal bottom side and a top side tapering from the hub 12 towards the outer periphery of the disk 1. According to FIG. 1, the bottom side which is contacted by the fluid is provided with a smooth surface so that the manufacture of the disk 1 can be carried out in an especially simple manner, but that nevertheless the disk achieves a sufficient suction effect upon being rotated.

Figure 2:
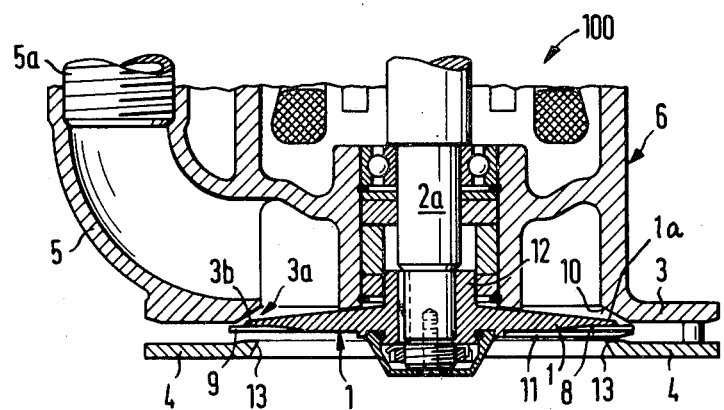
FIG. 2 shows a longitudinal section of a lower region of the radial injector which is provided with a plurality of channels and projecting ribs.
Figure 3:
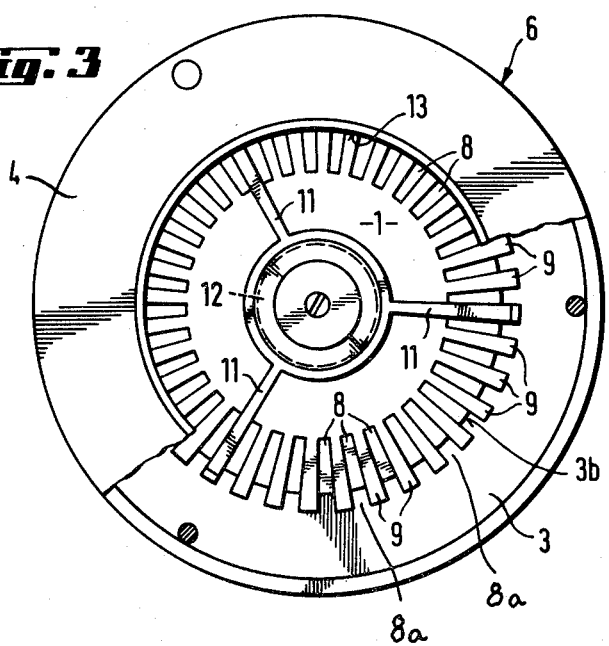
FIG. 3 is a view from below on the radial injector according to FIG. 2.

Turning now to FIGS. 2 to 8 and especially to FIGS. 2 and 3, there is shown a lower region of the radial injector 100 in which the bottom side of the disk 1 is arranged with a plurality of channels 8 uniformly spaced around the periphery of the disk 1. The channels 8 are radially extended and are developed in a manner to be subsequently described. The bottom side of the rotating disk 1 is provided with a plurality of recesses 1a at the outer region thereof. The recesses are uniformly spaced around the periphery of the disk 1 in radial direction and, each of the recesses communicates with a wedge-shaped tooth 9 in such a manner that the horizontal plane of the bottom side is reestablished by the respective tooth 9. Consequently, each channel 8 is defined between two respective teeth 9 in radial direction of the disk 1. As can be seen from FIG. 3, each tooth 9 is projected beyond the periphery of the disk 1 so that a slit 8a is formed between two respective teeth 9 in radial elongation of the respective channel 8. Through the slits 8a which are uniformly spaced beyond the periphery of the disk 1, a sufficient mixing between the fluid and the aspirated gas is achieved which mixing is of advantage during aerating of fluid.

Referring now to FIG. 4, it is shown there that only a few of the wedge-shaped teeth 9 are projecting beyond the periphery of the disk 1. The projecting teeth 9 are also uniformly spaced, thereby defining a greater interspace between them. The teeth 9 which are not projected from the periphery of the disk 1 are flush with each respective channel 8. Each channel 8 which is defined by two respective teeth 9 has a depth of 1 to 2 mm depending on the quantity of fluid to be transported and a length which correspond to half the distance from the hub 12 to the periphery of the disk 1.

As can be seen from FIGS. 2 to 4, the bottom side of the rotating disk 1 is additionally provided with three ribs 11 which are projecting in downward direction towards the fluid from the bottom side and are uniformly spaced around the disk 1. Each rib 11 extends radially from the hub 12 of the rotating disk 1 to beyond the periphery of the disk wherein the respective tooth 9 is completely covered by the respective rib 11 which are projected from the bottom side by a few millimeters. The ribs 11 increase the acceleration and the quantity of the fluid to be transported and cooperate with the cover plate 4 in a manner to be described further below.

As already described, the radial injector 100 is provided with an annular cover plate 4 at a distance to the bottom side of the rotating disk 1; the cover plate 4 has an inner diameter smaller than the outer diameter of the rotating disk 1, thereby partly overlapping the disk 1 and consequently defining the passage 3c. The cover plate 4 shields the area of the fluid radially flowing off against the outer static liquid pressure, so that the mixing zone of the fluid and the gas is not or at most hardly subjected to the static pressure. Moreover, as already indicated, the cover plate 4 cooperates with the ribs 11 in such a manner that impurities of the fluid are rejected and retained. As can be especially seen from FIG. 2, the ribs 11 are arranged at a very small distance to the cover plate 4.

The flange portion 3 is cooperating with the annular cover plate 4 so as to define an outwardly open mixing and diffuser chamber 14 in radial elongation of the rotational disk. The distance between the housing flange 3 and the cover plate 4 is determined by the thickness of the outer region 3b of the disk 1 and the mutual clearance of the disk 1 relative to the housing flange 3 and the cover plate 4. Through the mixing and diffuser chamber 14 which is hardly influenced by the hydrostatic pressure, a sufficient mixing of the fluid and the gas is additionally achieved, as well as a sufficient radial centrifuging of the fluid having a high suction effect at the ring slots 3a.

In order to increase the effect of retaining impurities from the mixing and diffuser chamber, the cover plate 4 is provided with a wedge-shape retaining edge 13 at the inner diameter facing the rotating disk 1 which edge 13 is elevated in direction to the disk 1. As can be seen from the FIGS. 5 and 6, the retaining edge 13 is provided with arched recesses 14 spaced around the periphery of the cover plate 4. It is also possible to arrange the arched recesses 14 in such a manner that they are adjacent to each other. Consequently, the inner ring of the retaining edge 13 has a wave-like shape so that a permanent circulating of an accumulation of impurities is essentially prevented when the disk 1 is in rotational movement.

Figure 7:
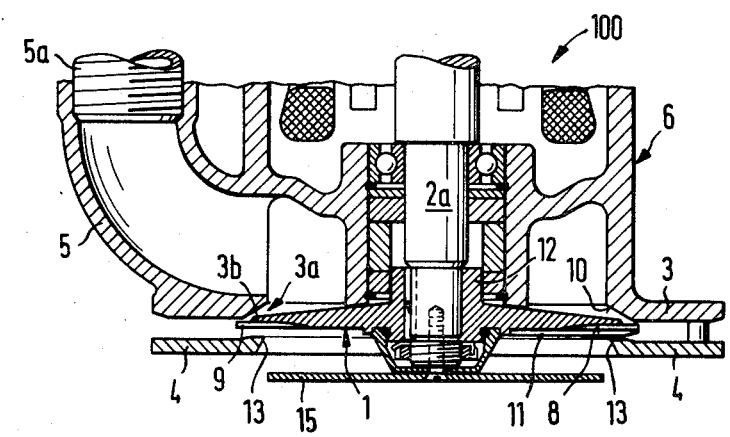
FIG. 7 shows a longitudinal section of the lower region of the radial injector illustrating a rejecting plate attached to the radial injector.
Figure 8:
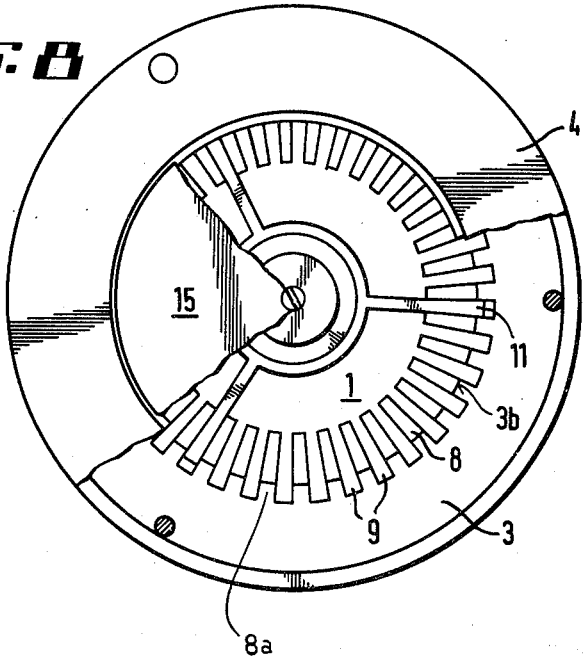
FIG. 8 is a view from below on the radial injector according to FIG. 7.

Turning now to FIGS. 7 and 8, there is shown a further improvement for retaining impurities from entering into the radial injector. An annular rejecting disk 15 is attached to the shaft 2a at a distance of approximately 5 to 15% of the diameter of the rotating disk relative to the bottom side thereof. The rejecting disk 15 has an outer diameter corresponding essentially to the inner diameter of the cover plate 4 and is coaxially driven with the disk 1. However, the rejecting disk 15 can be coupled with the rotating disk 1 especially with the hub 12. The provision of the rejecting disk 15 assures that at least a major part of the solid components contaminating the fluid are retained and rejected from entering the actual rotating disk 1, due to the rotation of the rejecting disk 15 and the resulting flow condition in the fluid below the disk 1. A possible clogging within the slot area at the outer region 3b is therefore prevented so that the suction effect is not diminished even when using the radial injector 100 in a contaminated fluid like sewage effluent, waste water or the like.

Referring now to FIGS. 9 to 13, a second embodiment of the radial injector 100 is illustrated in these Figures which differs from that of FIGS. 1 to 8 essentially in the development of the flange portion 3, the rotating disk 1 and the cover plate 4. According to FIG. 9, the flange portion 3 overlaps the outer periphery 3b of the rotating disk 1 in such a manner that a longitudinal ring slot 3a is achieved. The edge of the flange portion 3 facing the rotating disk 1 is bevel-shaped so that a conical inlet to the ring slot 3a is obtained. The rotating disk 1 is provided with a top side which is parallel to the bottom side. At a distance to the bottom side of the disk 1 there is arranged the cover plate 4 which overlaps the outer region of the bottom side so as to form the passage 3c of longitudinal shape for the fluid to be mixed with gas which is flowing through the ring slot 3a. Therefore, a very intensive mixing of the gas and the fluid is achieved.

As can be seen from FIG. 10, the side of the flange portion 3 facing the disk 1 is provided with channels 8b in order to increase the quantity of gas to be injected. The channels 8b are extending radially at the outer region of the flange portion 3 and are developed in the same manner as the channels 8 already described in connection with the first embodiment. The channels 8b are cooperating with slits arranged in radial elongation of the rotating disk 1 and defined by projections 9a projecting from the periphery of the disk 1. For preventing impurities from entering into the passage 3c, the bottom side of the disk 1 is provided with a cutting edge 7 which retains the contaminating components.

Turning now to FIG. 11, there is shown an arrangement of the rotating disk 1 which is similar to FIG. 2. Accordingly, the bottom side is provided with recesses 1c which are uniformly spaced in radial direction around the periphery of the disk 1. Each of the recesses 1c receive a tooth 9 which also projects beyond the periphery of the disk 1 in such a manner that the upper surface of the tooth 9 is in alignment with the top side of the rotating disk. Consequently, the channel 8 is defined by two respective teeth 9 wherein in elongation of each channel 8, the slit is provided. The flange portion 3 is also provided with radially extending channels 8b on the side facing the slits. In FIG. 12, each tooth 9 is arranged with a stepped portion 9b in which the cover plate 4 is engaged in order to retain impurities from entering into the injector. Moreover, the upper surface of each tooth is offset to the top side of the disk 1 so that the ring slot 3a has a stepped shape since the distance between the flange portion 3 and the cover plate 4 is reduced.

It is to be noted that all features and embodiments shown and described in the description, claims and drawing can be used individually as well as in arbitrary combination with each other.

It will be understood that each of the elements described above, or two or more together, may also find a useful application in other types of radial injectors differing from the types described above.

While the invention has been illustrated and described as embodied in a radial injector, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and described to be protected by Letters Patent is set forth in the appended claims:

1. A radial injector for aspirating gases to be mixed with a fluid, comprising a motor housing having a motor therein; rotating means connected to the motor and having a bottom side to be contacted by a fluid and a top side to be contacted by a gas, the rotating means being formed as a rotating disc having the bottom side and a radially outer region and provided at the bottom side in the radially outer region with a plurality of radially extending recesses which form a plurality of radially extending teeth therebetween; and a flange portion projecting outwardly from the motor housing and being integral therewith and cooperating with the rotating means for providing a ring slot.

2. A radial injector as defined in claim 1, wherein the radially extending recesses and thereby the radially extending teeth are uniformly distributed in a circumferential direction of the rotating disc.

3. A radial injector as defined in claim 1, wherein the rotating disc has a predetermined thickness in the radially outer region, the recess having at least radially outer portions extending over the entire thickness of the radially outer region of the rotating disc, so that a through-going slit is formed between each two neighboring teeth in said radially outer region.

4. A radial injector as defined in claim 1, wherein said rotating disk has a thickness and a periphery wherein the thickness diminishes gradually towards a periphery of the disk.

5. A radial injector as defined in claim 1, wherein the bottom side and the top side extend parallel to each other.

6. A radial injector as defined in claim 5, wherein the bottom side of the rotating disc is provided with stepped teeth, thereby defining a space in which the cover plate is engaged.

7. A radial injector as defined in claim 5, wherein the bottom side of the rotating disc is provided with a vertically protruding cutting blade adjacent the inner diameter of the cover plate.

8. A radial injector as defined in claim 7, wherein the height of the blade is 3 to 5 mm.

9. A radial injector as defined in claim 1, wherein the rotating disc has an outer border and the flange portion has an inner area which overlaps the outer border to form the ring slot therewith.

10. A radial injector as defined in claim 9, wherein the inner area of the flange portion facing the rotating disc is beveled, so at the ring slot is of conical cross-section.

11. A radial injector as defined in claim 10, wherein the inner area of the flange portion facing the rotating disc is provided with a plurality of radially extending channels.

12. A radial injector as defined in claim 1, wherein each tooth has a height of 1 to 2 mm.

13. A radial injector as defined in claim 1, wherein the rotating disc is connected to the motor via a hub, and the bottom side of the rotating disc is provided with at least two ribs extending radially from the hub beyond the rotating disc.

14. A radial injector as defined in claim 13, wherein the ribs are uniformly spaced around the rotating disc and project from the bottom side in downward direction towards the fluid.

15. A radial injector as defined in claim 1, wherein the injector further comprises an annular cover plate opposite to the flange portion and facing the bottom side of the rotating disc, the rotating disc having an outer diameter and the cover plate having an inner diameter smaller than the outer diameter for shielding the area of fluid radially flowing off against the outer static liquid pressure.

16. A radial injector as defined in claim 15, wherein a ring channel for the fluid is attachable to replace the cover plate.

17. A radial injector as defined in claim 15, wherein the cover plate and the flange portion define an outwardly open mixing and diffuser space arranged in radial elongation of the rotating disc.

18. A radial injector as defined in claim 17, wherein the mixing and diffuser space is provided with straight diffuser deflecting vanes.

19. A radial injector as defined in claim 17, wherein the mixing and diffuser space is provided with curved diffuser deflecting vanes.

20. A radial injector as defined in claim 17, wherein the cover plate and the flange portion are arranged at a distance to each other which is determined by the thickness of the rotating disc at the border thereof and the clearance between the rotating disc and the cover plate as well as the flange portion.

21. A radial injector as defined in claim 20, wherein the cover plate has a wedge-shaped rim facing the outer border of the bottom side of the rotating disc.

22. A radial injector as defined in claim 21, wherein the wedge-shaped rim is elevated in direction to the bottom side.

23. A radial injector as defined in claim 22, wherein the wedge-shaped rim has a periphery along which a plurality of arched recesses is uniformly spaced.

24. A radial injector as defined in claim 23, wherein the plurality of arched recesses are directly adjacent to each other around the periphery of the rim.

25. A radial injector as defined in claim 1, wherein the injector further comprises an annular rejecting plate having smooth surfaces at a distance to the bottom side of the rotating disc, the plate having an outer diameter corresponding approximately to the inner diameter of the cover plate.

26. A radial injector as defined in claim 25, wherein the rotating disc have a predetermined diameter, the distance between the rotating disc and the rejecting plate being equal to 5 to 15% of said diameter.

27. A radial injector as defined in claim 26, wherein the rejecting plate is coaxially driven with rotating disc.

28. A radial injector as defined in claim 1, wherein the motor housing is arranged in vertical position and has a shaft in longitudinal direction thereof, while the rotating disc is arranged horizontally thereto.

* * * * *